US007391017B2

(12) United States Patent
Kostrzewa et al.

(10) Patent No.: US 7,391,017 B2
(45) Date of Patent: Jun. 24, 2008

(54) MASS SCALE ALIGNMENT OF TIME-OF-FLIGHT MASS SPECTRA

(75) Inventors: Markus Kostrzewa, Taucha (DE); Stefan Klepel, Taucha (DE); Thomas Maier, Leipzig (DE)

(73) Assignee: Bruker Daltonik, GmbH, Baemen (DE)

( * ) Notice: Subject to any disclaimer, the term of this patent is extended or adjusted under 35 U.S.C. 154(b) by 435 days.

(21) Appl. No.: 11/249,147

(22) Filed: Oct. 12, 2005

(65) Prior Publication Data

US 2006/0095212 A1 May 4, 2006

(30) Foreign Application Priority Data

Oct. 20, 2004 (DE) ....................... 10 2004 051 043

(51) Int. Cl.
*B01D 59/44* (2006.01)
*H01J 49/00* (2006.01)

(52) U.S. Cl. ........................ 250/287; 250/281; 250/282; 250/283; 250/288; 250/397; 250/423 P; 435/6; 435/91.1; 435/91.2; 436/94; 702/22; 702/23; 702/27; 702/28

(58) Field of Classification Search ................. 250/281, 250/282, 283, 287, 288, 397, 42 P, 3; 435/6, 435/91.1, 91.2; 436/94; 702/22, 23, 27, 702/28

See application file for complete search history.

(56) References Cited

U.S. PATENT DOCUMENTS

| | | | |
|---|---|---|---|
| 5,654,545 | A | 8/1997 | Holle et al. |
| 5,969,348 | A | 10/1999 | Franzen |
| 6,188,064 | B1 | 2/2001 | Köster |
| 6,498,340 | B2 | 12/2002 | Anderson et al. |
| 2004/0108452 | A1 | 6/2004 | Graber et al. |

FOREIGN PATENT DOCUMENTS

| | | | |
|---|---|---|---|
| GB | 2 352 298 | A | 1/2001 |
| GB | 2 412 487 | A | 9/2005 |
| WO | WO 96/29590 | A1 | 9/1996 |
| WO | WO 98/09314 | A1 | 3/1998 |
| WO | WO 00/22649 | A1 | 4/2000 |
| WO | WO 2004/089972 | A2 | 10/2004 |

*Primary Examiner*—Jack I. Berman
*Assistant Examiner*—Meenakshi S Sahu
(74) *Attorney, Agent, or Firm*—The Law Offices of Paul E. Kudirka

(57) ABSTRACT

The invention generates mass scale comparability between mass spectra which are acquired in time-of-flight mass spectrometers, particularly with ionization by matrix-assisted laser desorption. Always slightly distorted mass scales of different mass spectra from the same type of sample can be aligned. The flight times of identical ions always differ slightly from one mass spectrum to the next due to non-reproducible processes in the ionization method. Thus the apparent mass values of ion signals of identical substances in different mass spectra do not match even if the flight times are converted into mass values with the identical calibration equation. After alignment of the mass scales, mass spectra can be reliably compared with respect to deviations in intensities of bio-makers, or be added together without deterioration in the mass resolution, and improved reference spectrum libraries can be created. Furthermore, the invention allows more reliable library searches to be carried out.

12 Claims, No Drawings

MASS SCALE ALIGNMENT OF TIME-OF-FLIGHT MASS SPECTRA

FIELD OF THE INVENTION

The invention generates mass scale comparability between mass spectra which are acquired in time-of-flight mass spectrometers, particularly with ionization by matrix-assisted laser desorption.

BACKGROUND OF THE INVENTION

For many applications, mass spectra are acquired in linear time-of-flight mass spectrometers because of their particularly high detection sensitivity, even though the quality of the spectra from time-of-flight mass spectrometers with reflectors is actually incomparably superior. The reflector in the time-of-flight mass spectrometer compensates different initial ion velocities and therefore delivers a far better mass resolution and mass reproducibility.

The masses of the substances are calculated by the flight times of their ions, using a calibration curve. The calibration curve is determined before by using reference mixtures of known substances with known masses.

The inadequate quality of the mass spectra obtained by matrix-assisted laser desorption in linear time-of-flight mass spectrometers is principally due to the formation of ions which delivers ions of widely differing initial velocities. There is a broad distribution of the ion's initial velocities, resulting in different flight times of ions of the same kind, broadening the ion signal and thus deteriorating the mass resolution. And there is a scattering of the mean velocity of the ions, resulting in different mean flight times and thus in wrong mass values, after the flight times are converted to mass values using the calibration curve.

The spectrum quality with respect to mass resolution can be improved by the method of delayed acceleration of the ions, whereby ions with different initial velocities are time-focused at the location of the ion detector (A. Holle et al., U.S. Pat. No. 5,654,545 A). This time focusing at the ion detector strictly acts only for ions of a single mass in the mass spectrum; for all other ions the location of the time focusing is in front of or behind the detector. By taking special measures, this time focusing can be made to occur at the same location (the location of the ion detector) for ions of different masses, so that a mass spectrum is produced that delivers a uniform resolution over the entire spectrum (J. Franzen, DE 196 38 577 C1, U.S. Pat. No. 5,969,348 A), although the mass resolution in time-of-flight mass spectrometers operated in linear mode is only ever moderately good because of the release of energy as ions decompose, as described in more detail below.

Even if the delayed ion acceleration improves the resolution of the mass spectra, the method cannot fully eliminate the influence of the scattering mean initial ion velocities on the masses. The processes during ionization of the substances in the laser-induced vaporization cloud are not very easily reproducible; they depend greatly on the structural inhomogeneities of the microcrystalline sample after it has been prepared. The inhomogeneities force the operator to use slightly different laser energy density settings in the laser focus on the sample, and this variation in turn leads to different average initial velocities of the ions in the explosively expanding vaporization cloud. Furthermore, the uneven thickness of the sample preparation causes the formation of ions at differing initial potentials, with the result that they pass through different potential differences, and therefore absorb slightly different energies, according to the location where they were formed. These two effects both influence the flight times of the ions and cannot be corrected.

The acquisition of mass spectra with time-of-flight mass spectrometers generally requires a very large number of individual spectra. Each individual spectrum consists of a large sequence of digital values, each value being a digitized measurement of the ion current arriving at the detector. Measurements are usually made in equal time intervals. Modern mass spectrometers measure the ion current every half nanosecond, i.e. they measure in a rate of two gigahertz. The individual spectra are usually added together, measuring value by measuring value, to form a sum spectrum. The ions for each individual spectrum are generated by a laser shot. This procedure of generating sum spectra is made necessary by the low measuring dynamics in the individual spectrum. At least about 50, and in some cases even 1,000 or more, individual spectra are acquired; in general, a sum spectrum consists of several hundred individual spectra.

The different average initial velocities and total energies of the ions in the laser shots mean that conversion of the ions' flight times into mass values should really be carried out differently for each laser shot. A conversion algorithm always of the same type but with different parameter sets could be used. However, as the parameters for converting the individual spectra are not known, such a method can only be applied if some reference ion types whose exact masses are known occur in each mass spectrum.

In actual practice it is extremely seldom that this time-consuming individual conversion of each individual spectrum is used. Instead the operator trusts that at least the time-of-flight spectra of one sample preparation will match sufficiently so that the spectra can be added together, measurement by measurement. It is accepted that the mass resolution and signal-to-noise ratio will deteriorate. The reason for not carrying out this individual conversion is often to save time; but in many cases it is simply not possible, or it is inappropriate for analytical reasons, to add reference substances to the sample preparations for the purpose of individually recalibrating the individual spectra.

In the linear operating mode of a time-of-flight mass spectrometer, it is possible to detect not only the stable ions, but also the fragment ions from so-called "metastable" decompositions of the ions, and even neutral particles that are formed from the ion decompositions along the way. All these fragment ions and neutral particles which have resulted from a single parent ion species have the same velocity as the parent ions and therefore reach the ion detector at the same time. In many areas of application, this gives a ten-fold to hundred-fold detection sensitivity; this applies, for example, to the measurement of protein profiles when searching for biomarkers, or to the protein profiles of microorganisms for the purpose of their identification. For these applications, the energy of the desorbing and ionizing laser is raised, thereby increasing the ion yield, but also their instability. This increased detection sensitivity is of such decisive importance for many applications that many of the disadvantages of linear operation of time-of-flight mass spectrometers described above are accepted.

However, the disadvantages described mean that no cleanly comparable mass spectra are obtained. The mass spectra have distorted mass scales; ions of the same substance do not show the same mass value. It is difficult, for example, to create a good reference spectrum library for identifying microbes on the basis of their protein profiles. Spectra of the same microbes from different sample preparations do not match exactly, but display apparently different mass values for what are actually identical proteins. Deviations of up to one percent of the mass value have been observed.

If a good reference spectrum library is successfully created in spite of these difficulties, there are then problems for searching in the library because the acquired mass spectrum of a microbe can be randomly distorted along the mass scale, and therefore no mass spectrum with a sufficiently good match of the mass values and intensities is found in the library.

Apart from the disadvantages of distortion of the mass values, as described above, mass spectra of metastable ions acquired with linear time-of-flight mass spectrometers always have an inferior mass resolution. This is due to the decompositions of the ions. When an ion decomposes, a small excess of internal energy is always released as kinetic energy of the two ion fragments. Depending on the direction of the decomposition in relation to the direction of flight, the particles may be slightly accelerated or slightly decelerated, which results in smearing of the flight times of particles that have the same parent ion mass. This in turn reduces the mass resolution. This reduction in resolution is thus inseparably connected with the increase in detection sensitivity, and cannot, in principle, be removed. Mass resolutions in this case amount to only R=1,000 to R=2,000, compared to good reflector type mass spectra with R=20,000 to R=40,000.

Today, linear time-of-flight mass spectrometers have three principal applications:

in protein profile analysis when searching for "biomarkers" as indicators of certain stress situations of the body and for corresponding diagnostic procedures, such biomarkers are proteins which are up or down regulated by the stress;

in protein profile analysis for identifying microbes and in mass spectrometric analysis of mutations of genetic material.

In all three applications, mass spectra up to high mass ranges of, for example, 20,000 Daltons are measured. Because of the low mass resolution, the isotope groups, which consist of ion signals that differ by one Dalton respectively, cannot be resolved in major parts of the mass spectrum. Therefore, only the envelopes of the isotope groups are measured, a fact that makes the mass determination and a corresponding calibration difficult. Furthermore, protein profile spectra in particular are very signal-intensive, with many overlapping ion signals, which greatly impedes the comparison of patterns. The protein profile spectra can certainly contain the ion signals of several hundred different proteins.

A method which allows the so-called "monoisotopic mass" to be calculated from an envelope of the isotope group of a protein has been elucidated in Patent DE 198 03 309 C1 (C. Köster, U.S. Pat. No. 6,188,064 B1).

Time-of-flight mass spectrometers with reflectors have a very much better mass resolving power, in particular because no fragment masses contribute to the mass spectrum and different ion energies are compensated for. Nevertheless, here too, distortions of the mass scale occur. Although mass resolutions far above R=20,000 can be achieved, the mass accuracy after the device has been well calibrated, but without recalibration of the individual mass spectrum, is only around 30 to 50 ppm. A recalibration of the individual mass spectrum using internal reference masses reaches a mass accuracy of 5 ppm and better. "Mass accuracy" is usually defined as standard deviation between the "true" and the measured mass values.

If no internal reference masses are available, the same problem occurs here as with linear time-of-flight mass spectrometers, but on a much finer scale.

SUMMARY OF THE INVENTION

The invention provides a method which aligns the mass values of one mass spectrum with the mass values of a second mass spectrum by means of a linear transformation function, and achieves a better comparability of the two mass spectra as a result of this alignment. If necessary, a quadratic transformation function can be applied in a further step. Both mass spectra have to be obtained from identical or greatly similar samples, thus showing greatly similar intensity patterns throughout the mass spectrum. If it is a goal to calculate an average of the two spectra without deterioration of the mass resolution, such an alignment is a prerequisite. For the goal of finding up and down regulated proteins as biomarkers, such an alignment greatly helps. For a computer-assisted biomarker search, the alignment again is a prerequisite.

The parameters of the transformation equation for the mass values of the mass spectra can be determined by comparing a few selected characteristic ion signals of the ion signal pattern of both mass spectra which clearly can be recognized as belonging to the same species of ions. The objective of this is to map the masses of these selected characteristic ion signals on top of each other and thereby aligning the two mass spectra.

For this purpose, so-called mass lists of spectra are used, in each of which the mass values and the intensities of the ion signals of a spectrum are listed as they were obtained by conversion based on a best possible calibration of the mass scale of the mass spectrometer. Favorably, the widths of the ion signals, measured in mass units, are also listed. Instead of mass lists, flight time lists can be used, too, containing flight time values, intensities, and widths of the ion signals in flight time units.

First of all, a few characteristic ion signals from the mass list are selected and compared with each other using large mass tolerances. About three to nine such characteristic ion signals are sufficient for the first step. As "characteristic ion signals of the ion signal pattern" strongest ion signals in relatively small neighboring mass ranges from different parts of the spectrum can be used. The selected ion signals may not be the strongest signals of the whole spectrum, it is better to select outstanding solitary ion signals without overlaps, even if these ion signals are relatively small. Overlapping ion signals can be determined by their widths which then is higher than other ion signals in the corresponding part of the spectrum. The characteristic ion signals should be evenly distributed over a large part of the spectrum. The characteristic ion signals should only be accepted if they appear characteristic in both spectra with masses inside appropriate tolerance intervals. The similarity of the two patterns of the characteristic ion signals can be defined via intensity tolerance values for the intensity ratios of the ion signals.

If there is a strong similarity of the pattern of these three to nine characteristic ion signals within the relatively wide mass tolerance intervals, the mass values of the characteristic ion signals are mapped on top of each other as accurately as possible using a linear transformation function. The linear transformation only contains one shift parameter and one expansion parameter, i.e., the mass scale of one spectrum is only shifted by a small amount and expanded by a small factor to achieve a best match of the characteristic ion signals. After transformation, the characteristic ion signals match with much smaller tolerances.

It should be emphasized that the mass values are by no means "more accurate" as a result of this transformation. The term "accurate" is defined as the absence of systematic errors between the calculated and the "true" masses of the ions.

After such a transformation, the ion signals of the two spectra merely have more closely matching mass values if they belong to the same ion species, but the masses after transformation are possibly even more inaccurate than before.

If the process is successful, an iterative process can give a further improvement of the alignment. In the iterative process, additional characteristic ion signals can be included. Termination criteria determine whether a sufficiently similar spectrum is actually achieved.

Further refinements can be made by means of another transformation incorporating a quadratic term. In particular, this makes it possible to achieve better matching of the outer spectral regions at very high and very low masses.

The method can, in particular, be used for producing reference spectra in a spectrum library. The reference spectra are averaged from a large number of mass spectra of samples of the same type. The newly acquired spectra are each aligned with the average spectrum of the mass spectra that have already been aligned to each other before they are integrated into the average value.

The method can, furthermore, be used for the actual searching in libraries. If there is an initially approximate match between the patterns of several characteristic ion signals, one can attempt to produce a finer match by aligning the mass spectra.

The method can also be used to align groups of spectra, each of which has been acquired at one position on a prepared sample, before they are added together, and thus to achieve an enhanced sum spectrum.

DETAILED DESCRIPTION

This invention is directed to the recognition of the problem then to the presentation of a highly inventive solution for the problem. The problem of misaligned mass spectra, particularly of time-of-flight spectra obtained with ionization by matrix-assisted laser desorption (MALDI), is nasty but, as to our present knowledge, no one hitherto has sought to solve the problem by a mathematical alignment of the misaligned mass spectra. Most of the effort spent hitherto was directed towards an improvement of the laser desorption and ionization process and towards an uniform acceleration of the ions. However, these efforts did not show much success.

The invention defines a method whereby the mass scale of a fresh mass spectrum acquired in a time-of-flight mass spectrometer is adjusted to the mass scale of a first mass spectrum, referred to as the "master spectrum", which originates from an identical or at least very similar sample. The adjustment uses, in a first step, a simple linear transformation function for the mass values. In most cases, this simple linear transformation function achieves sufficiently good results. In some cases, a quadratic transformation function may be used for further improvement in further transformation steps.

When the expression "adjustment of the mass spectra" is used below for simplicity, this always means an adjustment of the mass values of one spectrum to the mass values of a second spectrum, the master spectrum, or an adjustment of the mass values of both spectra to a common average spectrum composed of averaged mass values for identical ion signals.

The method relates preferably to mass spectra that have been measured in a linear time-of-flight mass spectrometer or in the linear mode of a time-of-flight mass spectrometer with reflector. However, the improvement can also apply—in other precision classes for mass determinations—to mass spectra that have been measured in the reflector mode. The method is described here primarily for mass spectra from linear time-of-flight mass spectrometers.

The mass spectra that are to be compared with each other are expediently available in "mass lists" containing the mass values of ion signals calculated via the calibration curve of the instrument and the intensities of these signals. The mass values may be slightly inaccurate on account of the distortions of the flight times described above. It is particularly expedient to also list, in addition to the intensities, the width of the ion signal measured at half height so that these ion signal widths can be used to identify overlaps with other ion signals of other substances.

The proposed method for alignment also works with lists containing the original flight time values instead of mass values, and ion signals widths in flight time units instead of mass units. If flight time lists are used, the description below has to read "flight time values" instead of "mass values", "flight time differences" instead of "mass differences", and so forth. The mathematical method otherwise is identical. The use of flight time lists usually makes it unnecessary to use the quadratic correction, the linear correction with shift value and expansion factor suffices in most cases. However, the corrected flight times have to be converted finally into mass values by the mass calibration function of the mass spectrometer.

The alignment process begins with a search for a relatively small number of characteristic ion signals in the master spectrum, for example solitary ion signals above a threshold in predetermined regions of the master spectrum; the threshold selected can be either absolute or relative to the average height of the ion signals in the vicinity. In addition, the solitary ion signals have to have a sufficiently small width of their envelope to be accepted, i.e. no overlapping ion signals should be included.

As an example, the search for biomarkers using two cohorts of protein profile spectra will be chosen. The samples of one cohort of spectra stems from healthy patients, the samples of the other cohort were acquired from diseased patients. Up or down regulated proteins with statistical significance are searched for in the sample cohort of the diseased patients (compared with the cohort of healthy patients) as possible biomarkers for the disease. In this example, all spectra have been acquired in the mass range from 600 to 20,000 Dalton. The spectra are relatively rich in ion signals. To be able to compare ion signals within this collection of mass spectra in order to look for up or down regulations, the mass scales of all spectra must be comparable.

We regard the mass spectrum acquired at first as the master spectrum. In this example, seven characteristic ion signals now should be selected in this first spectrum, if possible evenly distributed over the mass range. Characteristic solitary ion signals are therefore sought in the vicinity of the goal masses 2,500, 5,000, 7,500, 10,000, 12,500, 15,000, and 17,500 Daltons. These signals are automatically searched as being the largest ion signals in a narrow environment each, and should be searched for in a mass range of plus or minus 500 Dalton around these goal masses. If possible, any ion signal found should be immediately investigated for its width. If the width indicates no overlap with other signals, the ion signal should be accepted as a characteristic ion signal. The result of this search is preferably a set of seven characteristic ion signals. If parts of the spectrum are relatively empty, the result may be a set of only six or even only five characteristic ion signals. The smaller set does not sincerely deteriorate the following alignment process. In the following, a set of seven characteristic ion signals will be assumed.

A freshly acquired mass spectrum of the same or the other cohort of samples is now searched for characteristic ion signals each corresponding to a characteristic ion signals in the master spectrum, considering a corresponding mass tolerance interval for each of the ion signals. The intensity pattern of the set of characteristic ion signals in the new spectrum is now investigated for similarity with the intensity pattern of the set of characteristic ion signals in the master spectrum. For the purpose of assessing the similarity of the intensity pattern, a tolerance value for the intensity ratios, say 30%, can be defined. If the intensity pattern is similar, the set of characteristic ion signals will be accepted; otherwise, the search for characteristic ions has to be continued, maybe in both spectra.

If the pattern of the characteristic ion signals is similar in both sets of characteristic ion signals, the mass values of the ion signals in both sets are examined to determine whether they display a systematic shift and an expansion that is correlated with the mass. The freshly acquired mass spectrum is then transformed by a shift transformation and an expansion transformation to match the mass scale of the master spectrum.

The following mathematical formula can be used for the transformation of the mass values $m_{old}$ into the mass values $m_{new}$ of the freshly acquired spectrum:

$$m_{new}=m_{old}+a+b\times(m_{old}-m_{mean})+c\times(m_{old}-m_{mean})^2,$$

where a is a shift of origin of the mass coordinates, which is regularly only a few Daltons in size; b is the expansion value for the mass coordinates, regularly smaller than one hundredth; and c is a quadratic marginal correction, regularly smaller than one millionth. The quantity $m_{mean}$ expresses approximately the centre of the mass spectrum; the corrections are only very weakly affected by the choice of this centre value. For example, an $m_{mean}$ of around 10,000 Daltons is selected for a protein profile spectrum that encompasses the range from 600 Daltons (approx. 5 amino acids) to 20,000 Daltons (approximately 140 amino acids).

The exact form of the above equation is selected because the equation allows for a sequential transformation: first the shift transformation with shift parameter a may be performed; then the expansion transformation with expansion parameter b may be applied; and only if still necessary, the quadratic correction with parameter c may be used.

To perform the shift, the parameter a has to be calculated. The parameter a is simply the average of the seven mass differences between the seven mass values of the characteristic ion signals in both spectra, the master spectrum and the fresh spectrum. The shift transformation shifts at least the central ion signals of the characteristic ion signals of the freshly acquired spectrum in such a way that they match the central characteristic ion signals of the master spectrum.

After the shift has been performed, the freshly acquired mass spectrum has to be expanded (or shrunk) in such a way that the two sets of characteristic ion signals match completely as well as possible. The corresponding expansion parameter b can be calculated as the average of the seven mass differences, divided each by $(m_{old}-m_{mean})$. If the mass $m_{old}$ of the central characteristic ion signal is very near to $m_{mean}$, it is better not to include this characteristic ion signal, to avoid a division by a very small number; a more safe procedure calculates the parameter b from the outer four characteristic ion signals only. The expansion parameter b may be positive (for an expansion) or negative (for a shrinkage). For the transformation, only the linear correction term $b\times(m_{old}-m_{mean})$ is used, usually resulting in a sufficiently good match of the two sets of characteristic ion signals, and, in fact, of the two complete mass spectra.

The shift and expansion transformation may be repeated for a better match, either with the same sets of characteristic ion signals, or with additional characteristic ion signals, searched for between the goal masses described above. For the search of new characteristic ion signals, narrower mass tolerance intervals can now be used; for example mass tolerance intervals of only a few tenths of a Dalton. This second transformation usually brings the mass differences in the two mass spectra down to around 200 ppm (parts per million) of the respective mass of the ion signal throughout the mass spectrum.

A more precise investigation of the two spectra, the master spectrum and the result of the transformations of the freshly acquired spectrum, may still show slight misalignments at both the lower end of the spectra and at the higher end. If at both ends the masses in the new spectrum are slightly higher than in the master spectrum for the same ion signals, or if at both ends the masses are lower, only then a quadratic correction is indicated. The quadratic transformation parameter c may be calculated easily as the average of the seven mass differences (or more, if more characteristic ion signals are used) divided each by $(m_{old}-m_{mean})^2$. Also here, the parameter c may be calculated only from the characteristic ion signals near to both ends of the spectrum to avoid division by very small numbers.

In the example above, all mass scales of the various mass spectra are shifted and expanded to match the master spectrum. If the mass scale of the master spectrum incidentally was extremely distorted, all the mass values of the subsequently adjusted mass spectra get the same distortions, and presumably become more inaccurate than necessary. This can be avoided by averaging the mass scales of all mass spectra. To build the average spectrum, both the first and second spectrum have to be shifted towards each other (each by a/2) and both spectra have to be expanded and shrunk (each by b/2) to form a first pooled average spectrum. If a third spectrum has to be added to the pool, the pool spectrum has to be shifted by a/3, and the new spectrum by 2a/3, and so on. The $n^{th}$ spectrum has to be shifted by $n\times a/(n+1)$, whereas the pool spectrum only has to be shifted by $a/(n+1)$. An analogous method has to be applied for parameter b. By the statistical averaging process it can be assumed that the mass values of the pool spectrum are more accurate than that of a single spectrum, even if the method does not guarantee for accuracy of the mass values, as already emphasized above.

Such a method can, for example, be used to produce reference spectra for spectrum libraries. As an example, the production of a library of mass spectra of proteins from microorganisms is described here. Microorganisms of a well identified species are first of all grown in suitable colonies on a suitable culture medium in Petri dishes. Several organisms are taken from each colony and smeared onto a position on a MALDI sample carrier, where they are sprinkled with a solution of a suitable matrix substance. The proteins of the organisms destroyed in this process are integrated into the forming matrix crystals of the sample preparation. The sample is then measured in a linear time-of-flight mass spectrometer and gives a characteristic protein profile for each of these microbes. The mass spectra are acquired in the range from around 600 Daltons to 20,000 Daltons. The measurements are repeated frequently with suitable variation of the growing and sample preparation conditions. Each of the new mass spectra is adjusted to the existing reference spectra, which represent each a weighted average of all the mass spectra of this microorganism that have been measured to date. Only after this alignment, the new spectrum is incorporated into the average or pool spectrum.

In a similar way, the method of aligning the mass values of mass spectra can be used to carry out a search in a library of reference spectra using a mass spectrum of a microbe species. Here too, the search begins with wide tolerance windows around several characteristic ion signals. Then the mass spectra are aligned closer to each other by stepwise refinement with the aim of arriving at a high degree of similarity between the spectra, provided that the reference spectrum of an unknown microbe is actually present in the library. If there is a lack of similarity of the selected characteristic ion signals, the comparison with a reference spectrum is discontinued. In the vast majority of cases, the comparison is discontinued after the first step if the reference spectrum does not match; only in relatively few cases is termination delayed until after further refinement of the comparison. Following termination, a comparison is attempted with the next reference spectrum. In our experience, such a search leads to very reliable identifications.

In particular, the reference spectrum libraries can be prepared in advance for spectrum searching by storing a selection of characteristic ion signals with tolerance intervals for every reference spectrum.

This method can also be used to improve the quality of MALDI mass spectra acquired with linear time-of-flight mass spectrometers. As experience shows, individual spectra which are obtained at one location on the sample, using a stationary laser focus and without moving the sample, resemble each other relatively closely. They can therefore be added together point by point to give a group spectrum. As a rule, around 30 to 100 individual spectra of uniform quality can be measured at one location. These individual spectra are added and result in a first group spectrum. At a second location on the sample, a second group spectrum is then obtained, which can be aligned to the first group spectrum before the first and second group spectra are added together either as mass list entries or as mass spectra. The continuation with further group spectra finally leads to a sum spectrum which displays a considerably better resolution than a sum spectrum that is obtained by adding together all the individual spectra without prior grouping and alignment.

The last method described is also particularly interesting for mass spectra which are obtained in the reflector mode. They produce enhanced resolution if a very large number of individual spectra which do not all originate from the same point on the sample are to be added together to form a sum spectrum. This method does not necessarily improve the mass accuracies of this spectrum, but it does enhance the mass resolution. Mass accuracy can only be achieved by recalibrating the mass spectrum using internal reference ion masses.

What is claimed is:

1. Method for generating comparability between two time-of-flight mass spectra, comprising the following steps:

a) selecting a number of solitary characteristic ion signals each within a predetermined mass region throughout the first mass spectrum, b) selecting characteristic ion signals in the second mass spectrum, each within a small tolerance interval around one of the characteristic ion signals of the first spectrum, c) comparing the intensity pattern of the two sets of characteristic ion signals with predetermined intensity tolerance values for the intensity ratios, and eliminating those ion signals which do not match, d) calculate shift and expansion parameters from the two sets of characteristic ion signals, and e) shifting and expanding either the second mass spectrum to match the first spectrum, or shifting and expanding both mass spectra to form an average mass spectrum.

2. Method according to claim 1, wherein the mass spectra are represented as lists with mass values and intensity values.

3. Method according to claim 2, wherein the lists additionally contain the widths of the ion signals in mass units.

4. Method according to claim 3, wherein checking the widths of the characteristic ion signals is used to avoid the inclusion of overlapping ion signals.

5. Method according to claim 1, wherein the mass spectra are represented as lists with flight time values and intensity values for the ion signals.

6. Method according to claim 5, wherein the lists additionally contain the widths of the ion signals in time units.

7. Method according to claim 6, wherein checking the widths of the characteristic ion signals is used to avoid the inclusion of overlapping ion signals.

8. Method according to claim 1, wherein the time-of-flight mass spectra are acquired by ionization by matrix-assisted laser desorption.

9. Method according to claim 1, wherein the alignment of the ion signals is iteratively improved by using more characteristic ion signals.

10. Method according to claim 1, wherein an additional transformation with a quadratic term is used to obtain mass spectra which better match at the lower and higher mass end.

11. Method according to claim 1, wherein mass spectra are grouped together to form average spectra after they have been aligned.

12. Method according to claims 1, wherein a spectrum library contains library mass spectra, and wherein each library mass spectrum already contains a list of characteristic ion signals for assisting the alignment of further spectra.

* * * * *

UNITED STATES PATENT AND TRADEMARK OFFICE

CERTIFICATE OF CORRECTION

PATENT NO. : 7,391,017 B2
APPLICATION NO. : 11/249147
DATED : June 24, 2008
INVENTOR(S) : Markus Kostrzewa, Stefan Klepel and Thomas Maier It is certified that error appears in the above-identified patent and that said Letters Patent is hereby corrected as shown below:

Title Page, Item (73) Assignee:

Please replace “Baemen (DE)” with --Bremen (DE)--.

Signed and Sealed this

Thirtieth Day of December, 2008

JON W. DUDAS
*Director of the United States Patent and Trademark Office*